United States Patent

Lindgren

[15] 3,680,610
[45] Aug. 1, 1972

[54] SABRE SAW BLADE STRUCTURE
[72] Inventor: Wallace I. Lindgren, 3723 Dartmouth Dr., Minnetonka, Minn. 55345
[22] Filed: March 4, 1971
[21] Appl. No.: 121,021

[52] U.S. Cl............143/133 J, 143/68 E, 145/31 AB, 143/133 R
[51] Int. Cl. .............................................B27b 33/02
[58] Field of Search ..143/133 R, 133 J, 156 R, 68 E, 143/68 F; 145/31 R, 31 AC, 31 AB; 279/83

[56] References Cited

UNITED STATES PATENTS

| | | | |
|---|---|---|---|
| 1,882,328 | 10/1932 | Kinkel | 143/133 J |
| 3,033,251 | 5/1962 | Atkinson | 143/133 R |
| 3,572,409 | 3/1971 | Hoffman | 143/68 E |

*Primary Examiner*—Donald R. Schran
*Attorney*—Reif & Gregory

[57] ABSTRACT

A double edged sabre saw blade having oppositely disposed cutting edges, said cutting edges having a non-parallel relation converging in the direction of the free end of said blade to form a pointed plunge cutting end portion, said cutting edges each being adapted to cut in a direction oppositely that of the other.

2 Claims, 2 Drawing Figures

PATENTED AUG 1 1972      3,680,610

INVENTOR.
WALLACE I. LINDGREN
BY Richard Gregory
ATTORNEYS

SABRE SAW BLADE STRUCTURE

SUMMARY AND BACKGROUND OF THE INVENTION

It is desirable to have a reciprocating or sabre saw blade structure having oppositely disposed cutting edges which are adapted to cut in reverse directions with respect to one another and which blade more specifically is capable of cutting on each forward and rearward stroke of the saw blade.

The closest known structure in the prior art is disclosed in U. S. Letters Pat. No. 3,033,251 dated May 8, 1962 and issued to G. E. Atkinson et al. The structure of this patent discloses a blade comprising non-parallel cutting edges with one edge being parallel to the longitudinal axis of the blade and the other cutting edge diverging therefrom in the direction of the free end portion of the blade leaving a beveled or angled end portion of the blade of substantial length between the ends of the opposed cutting edges and providing a blade end of substantial width. Further the cutting edges of this blade are oriented to cut in the same direction, namely, on the pull or rearward stroke of the blade.

It is an object of the invention herein therefore to provide a sabre saw blade which has a pointed free end for effectively and quickly making a plunge cut.

It is another object of this invention to provide a sabre saw blade having oppositely disposed cutting edges adapted to cut reversely of each other whereby as in a plunge cut the blade exerts a cutting action with each forward and rearward stroke of the blade.

More generally stated, it is an object of the invention herein to provide a sabre saw blade having oppositely disposed cutting edges, said blade tapering to have said cutting edges converge in the direction of the free end of said blade forming a pointed end portion and said cutting edges being adapted to cut in directions reversely of one another.

These and other objects and advantages of the invention will be set forth in the following description made in connection with the accompanying drawings in which like reference characters refer to similar parts throughout the several views and in which FIG. 1 is a broken view in perspective with some portions on dotted line and showing the apparatus herein in operating position; and FIG. 2 is a view in side elevation.

DESCRIPTION OF A PREFERRED EMBODIMENT

Figure 1:
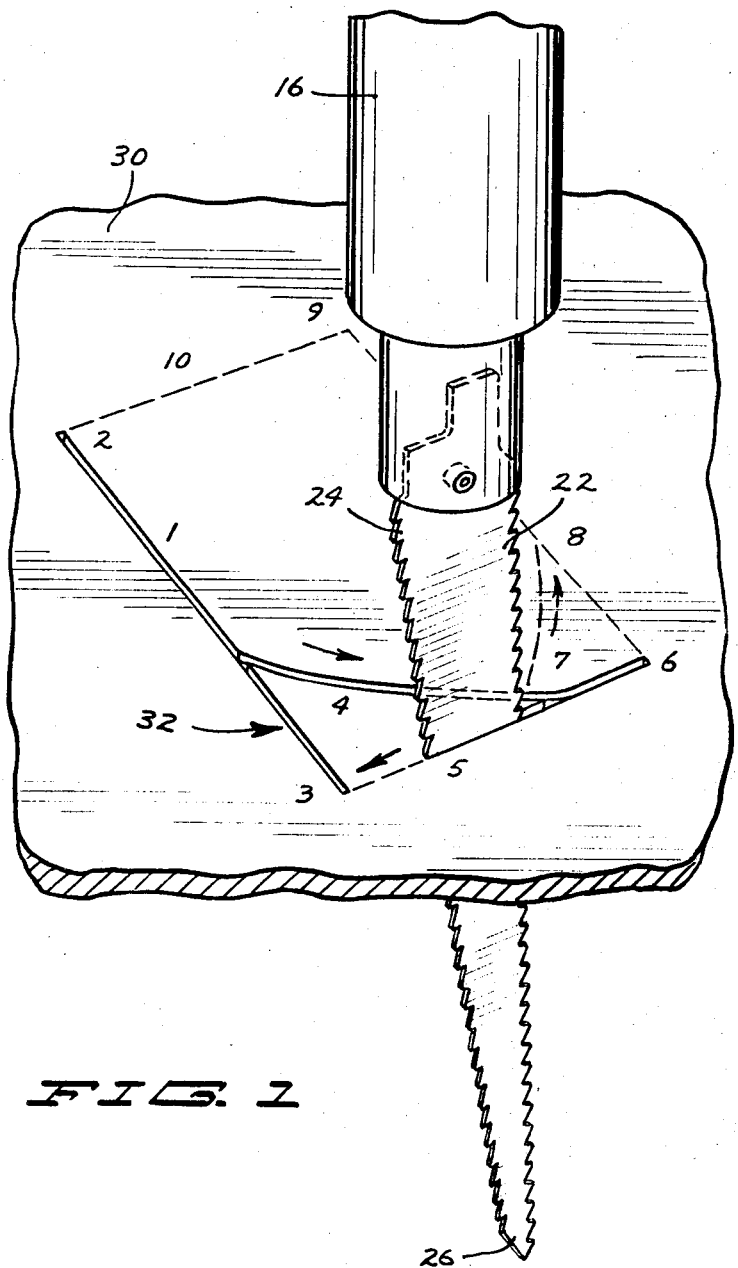

Referring to the drawings, a sabre saw blade 11 is illustrated comprising a shank portion 12 having an offset or terminal portion 13 and having an aperture 14 therein for mounting onto a conventional sabre saw 16 of which a fragmentary portion is here shown. Said sabre saw is indicated as having a conventional reciprocating shaft 18.

Figure 2:
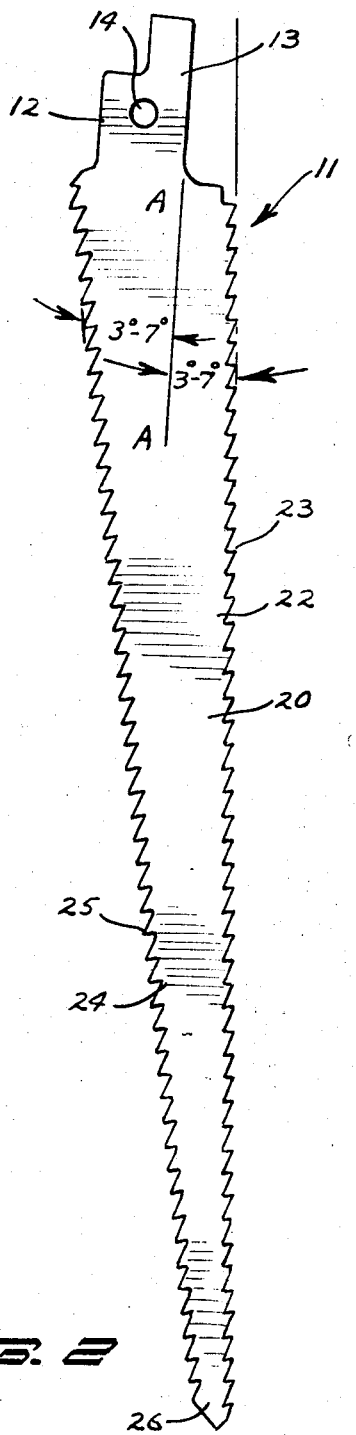

Said saw blade has a main body portion 20 which tapers towards its free end and which has oppositely disposed cutting edges 22 and 24. Both cutting edges preferably are disposed at an angular relationship with respect to the longitudinal axis of the blade, said axis being indicated by the reference line A—A as shown in FIG. 2. A preferable cant or angular relationship between each cutting edge and the longitudinal axis of said blade is in the range of 3° to 7°. Thus said cutting edges diverge in the direction of he shank portion 12 and converge to form a relatively small pointed plunge cutting free end portion 26.

Saw teeth 23 comprise the cutting edge 22 and are oriented to cut on the rearward or pull stroke of the shaft 18 and are oriented to clear out the kerf on the forward or push stroke. Saw teeth 25 comprise the cutting edge 24 and are oriented to cut on the forward or push stroke of the shaft 18 and to clear out the kerf on the rearward or pull stroke of said shaft. It will be noted that the teeth 23 and 25 are in close proximity to one another at said end portion 26 of said saw blade.

With reference to FIG. 1, the blade herein described is shown in an operating position. A board member 30 such as a sheet of plywood is indicated and it is understood that this may represent a floor, a wall, or a ceiling structure. A cutting operation for which a sabre saw is peculiarly adapted is known generally as a pocket cut, that is, a section of a board member is completely cut out and the portion here to be cut out is indicated by the reference numeral 32.

A pocket cut is more easily accomplished here than with a conventional sabre saw blade having only one cutting edge or having opposed cutting edges both adapted to cut in the same direction. It is desirable to make the complete pocket cut without having to remove the blade prior to a completion of the cutting operation and without having to turn the blade around.

The initial cut to penetrate a board member is referred to as a plunge cut which is well understood in the art. With the penetration of the board, the pocket cut is commenced. It is desirable to make the pocket cut and to cut out the corners in a continuous forward operation without having first to cut out a central portion thereof and thereafter cut out the corners.

To start the pocket cut, a plunge cut is made. Immediately that the blade has penetrated through the board its opposed reversely oriented teeth cut with each reciprocating motion of the blade. Thus the plunge cut to the full width of the blade is readily accomplished.

For purpose of illustration, it is assumed that a plunge cut was made in the corner area 3 generally as along the curve 4 and the cut would be continued along line 1 to the corner 2. This cut will be made with the cutting edge 24. The blade will next be brought rearwardly to have the cutting edge 22 cut the remainder of side 1 to the corner 3 and then the blade will be guided rearwardly and brought through the arcuate or corner cut 4 and along part of side 5 to the corner 6. The blade will then be backed up sufficiently to make the cut along the side 5 to the corner 3 and then the blade will be brought forward to make the corner or arcuate cut 7 to the side 8 and then rearward to the corner 6. In like manner the corner 9 and side 10 will be cut for completion of the pocket cut. Thus there has been a continuous cutting action utilizing the cutting edges at each side of the blade.

It is to be clearly understood that for a quick and efficient cutting action that both cutting edges are properly canted with respect to the longitudinal axis of the blade as herein described so that the normal holding of the saw exerts adequate cutting pressure to have the cutting edge bite into the wood.

A substantial advantage is gained with the initial plunge cut as immediately upon penetration of the board member both cutting edges are cutting on both the pull and push stroke of the saw blade in widening the initial cut and there is no cutting momentum lost in the movement of the saw blade in making the entire pocket cut.

Thus there has been provided an effective improvement in a sabre saw blade by means of having oppositely disposed cutting edges cutting reversely of one another and each being properly canted for efficient cutting.

It will of course be understood that various changes may be made in form, details, arrangement and proportions of the parts without departing from the scope of the invention herein which generally stated, consists in an apparatus capable of carrying out the objects above set forth, in the parts and combinations of parts disclosed and defined in the appended claims.

What is claimed is:
1. A reciprocating saw blade structure comprising
a main body portion of a saw blade,
a shank portion of said blade,
said blade having oppositely disposed cutting edges,
said cutting edges each diverging from the longitudinal axis of said blade in the direction of said shank portion and converging toward the free end portion of said blade forming a pointed plunge cutting portion,
said cutting edges comprising teeth, said teeth of each of said edges adapted to cut in a direction reversely that of the other, and
said teeth having close proximity to one another at said plunge cutting end portion.
2. The structure set forth in claim 1,
said cutting edges each diverging from said longitudinal axis of said blade in the range of 3° – 7°.

* * * * *